(12) United States Patent
Krueger et al.

(10) Patent No.: US 7,578,179 B2
(45) Date of Patent: Aug. 25, 2009

(54) EXHAUST GAS SIMULATION SYSTEM WITH DUAL PATH TEMPERATURE CONTROL FOR CONTROL OF EXHAUST TEMPERATURE

(75) Inventors: Ernest Melvin Krueger, San Antonio, TX (US); Cynthia Chaffin Webb, San Antonio, TX (US); Jason T. Miwa, San Antonio, TX (US); Robert W. Burrahm, Beijing (CN)

(73) Assignee: Southwest Research Institute, San Antonio, TX (US)

( * ) Notice: Subject to any disclaimer, the term of this patent is extended or adjusted under 35 U.S.C. 154(b) by 41 days.

(21) Appl. No.: 11/694,137

(22) Filed: Mar. 30, 2007

(65) Prior Publication Data

US 2008/0236134 A1 Oct. 2, 2008

(51) Int. Cl.
*G01M 15/10* (2006.01)
(52) U.S. Cl. .................................... 73/114.69
(58) Field of Classification Search .............. 73/114.69, 73/114.71, 114.74, 114.75, 114.76, 118.01, 73/118.02
See application file for complete search history.

(56) References Cited

U.S. PATENT DOCUMENTS

| | | | | |
|---|---|---|---|---|
| 6,112,575 | A * | 9/2000 | Cocconi | 73/23.31 |
| 6,796,165 | B2 * | 9/2004 | Abdul-Khalek | 73/28.01 |
| 7,021,130 | B2 * | 4/2006 | Schmidt | 73/114.69 |
| 2003/0079520 | A1 | 5/2003 | Ingalls, Jr. et al. | 73/23.31 |
| 2004/0007056 | A1 | 1/2004 | Webb et al. | 73/118.1 |
| 2004/0139785 | A1 * | 7/2004 | Abdul-Khalek | 73/28.01 |
| 2004/0226354 | A1 * | 11/2004 | Schmidt | 73/118.1 |
| 2006/0234174 | A1 * | 10/2006 | Burrahm et al. | 431/5 |

* cited by examiner

*Primary Examiner*—Eric S McCall
(74) *Attorney, Agent, or Firm*—Baker Botts LLP

(57) ABSTRACT

A temperature control system and method for use with an exhaust flow simulation system. A typical exhaust flow simulator is a burner-based system, in which exhaust from a combustive burner is exhausted through an exhaust line. A temperature control section divides the exhaust from the burner line into two paths: a cool path and an uncooled (hot) path. The cool path uses a heat exchanger to cool the exhaust. The cool path also has a control valve that controls the relative portions of hot and cool exhaust, which are re-mixed downstream the valve into an exhaust line. Various embodiments have different configurations for the two paths.

8 Claims, 3 Drawing Sheets

EXHAUST GAS SIMULATION SYSTEM WITH DUAL PATH TEMPERATURE CONTROL FOR CONTROL OF EXHAUST TEMPERATURE

TECHNICAL FIELD OF THE INVENTION

The present application relates in general to systems for simulating the exhaust flow of an engine, for use in testing devices affected by the exhaust.

BACKGROUND OF THE INVENTION

As a result of stricter regulations for automotive emissions, it was desired to design a testing apparatus and procedure for testing emissions control devices. Historically, actual internal combustion engines have been used for such evaluations. However, the use of a real engine for long term testing can be inconsistent, maintenance intensive, and expensive to operate. In addition, a real engine does not conveniently permit the separate evaluation of individual variables, such as the effects of various constituents of fuel and oil.

U.S. Patent Pub. No. 2003/0079520, entitled "Method and Apparatus for Testing Catalytic Converter Durability" and U.S. Patent Pub. No 2004/0007056 A1, entitled "Method for Testing Catalytic Converter Durability", both describe an exhaust flow simulation system. The system comprises a fuel-combustive burner with an integrated, computerized control system. The system realistically simulates the flow and composition of exhaust gas from an engine under a variety of load conditions.

A burner-based exhaust gas simulation system generates exhaust at elevated temperatures, as high as 1000 degrees or more. Yet, for testing purposes, the exhaust gas may need to be at a specific temperature or range of temperatures. Thus, for testing purposes, good temperature control is required. In the systems described in the preceding paragraph, a heat exchanger downstream the burner is used for temperature control.

BRIEF DESCRIPTION OF THE DRAWINGS

FIG. 1A illustrates the burner of FIG. 1 in further detail.

DETAILED DESCRIPTION OF THE INVENTION

Overview

The following description is directed to a burner-based exhaust flow simulation system, which produces a flow of exhaust gas with a composition and temperature corresponding to the exhaust flow produced by an internal combustion engine. The system can be used with or without injection of oil to simulate engine oil consumption. As explained below, a feature of the invention is the use of a "dual path temperature control section" downstream the burner.

As an example of one application of the exhaust gas simulation system, an emissions control device can be installed on the exhaust line downstream of the burner. The effect of extended driving conditions and elevated temperatures on the emissions control device can be simulated. The system can also simulate the effects of additives and contaminants from the engine. The system is capable of "aging" the emissions control device, which can then be evaluated, and if desired, performance tested on an actual vehicle.

Other applications of the exhaust flow simulation system are possible. Various sensors, such as those used for emissions monitoring and control, can be tested. Materials used to fabricate any component affected by exhaust gas can be tested. The subject of the testing may be a fuel, an additive, or an oil. Or, various environmental factors may be introduced and their effect evaluated.

U.S. Patent Pub. No. 2003/0079520 and U.S. Patent Pub. No 2004/0007056, referenced in the Background and incorporated by reference herein, each describes an exhaust flow simulation system with which the invention described herein may be used. For purposes of example, the invention is described for use with those systems. However, the invention is not limited to those particular systems, and in general, can be used with any burner-based exhaust flow simulation system.

Example of Burner-Based Exhaust Simulation System

Figure 1:
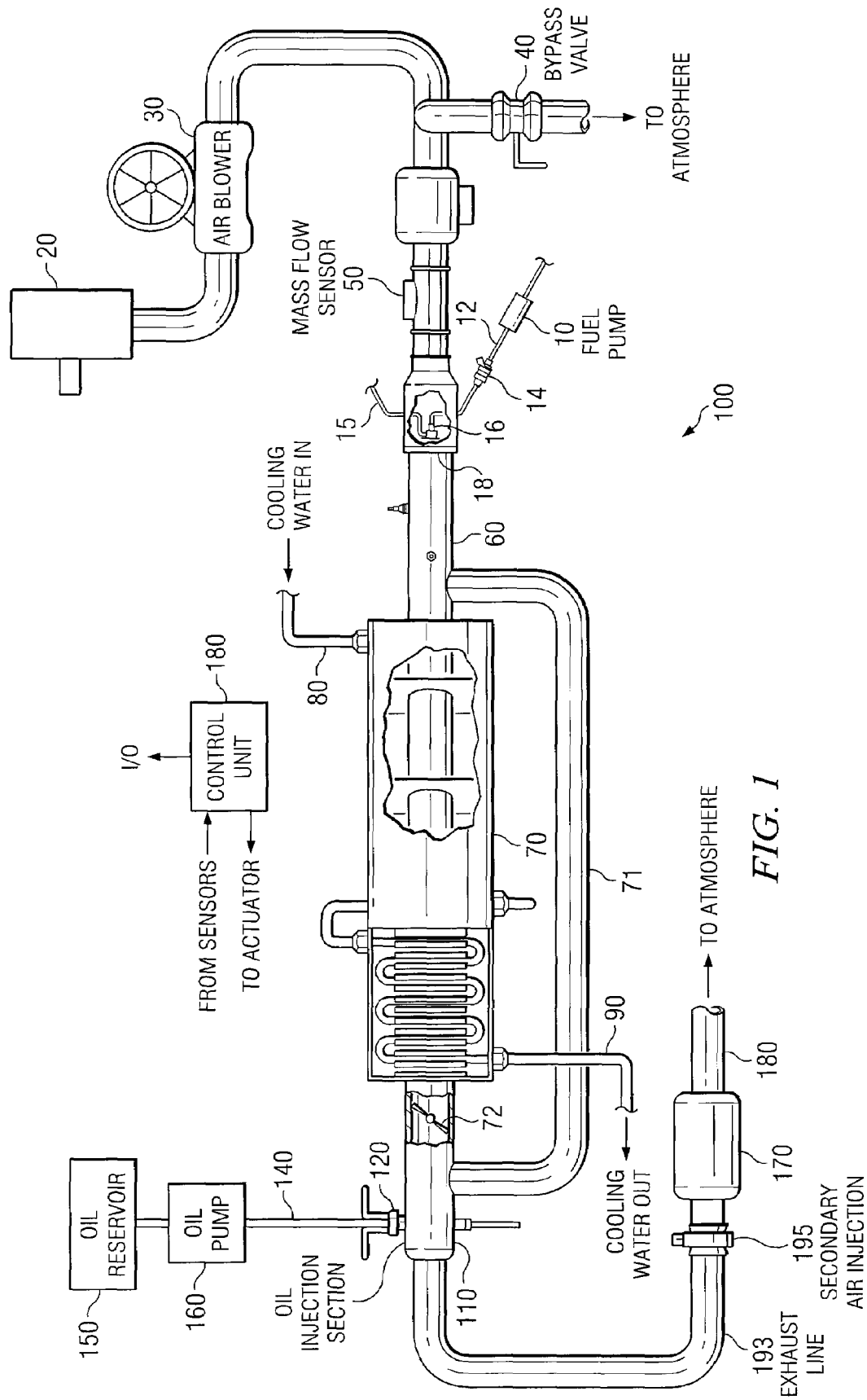
FIG. 1 illustrates an exhaust gas simulation system having a dual path temperature control section in accordance with the invention.

FIG. 1 illustrates an example of a burner-based exhaust flow simulation system 100 for providing exhaust in accordance with the invention. In the example of this description, an emissions control device 170 is installed for testing. However, as explained above, system 100 has numerous applications, not all of which require installation of such a device.

As explained below, system 100 provides exhaust from combustion of various fuels, which may be gasoline, diesel, or alternative fuels and fuel mixtures. The exhaust is provided with precise air-to-fuel ratio (AFR) control, and has a separate oil atomization system for definitive isolation of the effects of fuel and of lubricant at various consumption rates and states of oxidation. System 100 is capable of operating over a variety of conditions, allowing various modes of engine operation to be simulated, such as cold start, steady state stoichiometric, lean, rich, and cyclic perturbation.

System 100 has seven subsystems: (1) an air supply system to provide air for combustion to the burner, (2) a fuel system to provide fuel to the burner, (3) a burner system to combust the air-fuel mixture and provide the proper exhaust gas constituents, (4) a heat exchanger to control the exhaust gas temperature, (5) an oil injection system, (6) a secondary air injection system, and (7) a computerized control system.

Combustion Air Supply System

An air blower 30 draws ambient air through an inlet air filter 20 and exhausts a pressurized stream of air. A mass air flow sensor 50 monitors air flow. The volume of air supplied is set by adjusting bypass valve 40 to produce a desired flow rate of air.

The air blower 30, filter 20, and the mass air flow sensor 50 may be of any conventional design. An example of a suitable air blower 30 is an electric centrifugal blower. Control unit 180 may be used to actuate and/or receive data from the various elements of the air supply system.

Fuel Supply System

A fuel pump 10 pumps engine fuel through a fuel line 12 to a fuel control valve 14. An example of a suitable fuel control valve 14 is a solenoid valve that receives a pulse-width modulated signal from control unit 180, and regulates the flow of fuel to the burner 60 in proportion to the pulse width. Via the fuel line 12, fuel is delivered to a fuel spray nozzle 16 in the burner 60.

Burner

Burner 60 is designed to produce a desired combustion of the fuel and air. In the example of this description, burner 60 is a swirl-stabilized burner capable of producing continuous combustion at rich, lean, or stoichiometric air-fuel ratios.

FIG. 1A illustrates burner 60 in further detail. Burner 60 has both a plenum chamber 200 and a combustion tube 210, separated by swirl plate 18. The combustion tube 210 is constructed of material capable of withstanding extremely high temperatures. Preferred materials include, but are not necessarily limited to INCONEL or stainless steel, and optionally can have a quartz window for visual observation of the resulting flame pattern.

Air and fuel are separately introduced into the burner 60. Air from mass flow sensor 50 is ducted to the plenum chamber 200, then through the swirl plate 18 into the burner tube 210.

The swirl plate 18 is equipped with a fuel injector 16, implemented as an air-assisted fuel spray nozzle 16 at the center of the swirl plate 18. The swirl plate 18 has a central bore, and spray nozzle 16 is fitted to the swirl plate 18 at this central bore using suitable attachment means.

Fuel from the fuel supply line 12 is delivered to the spray nozzle 16, where it is mixed with compressed air from air line 15. The mixture is sprayed into the combustion tube 210. The compressed air line 15 provides high pressure air to assist in fuel atomization.

Combustion tube 210 is equipped with one or more spark igniters 220. In a preferred embodiment, three substantially equally spaced spark igniters 220 are located around the circumference of the combustion tube in the gas "swirl path" created by the swirl plate 18. An example of a suitable igniter is a marine spark plug.

Swirl plate 18 may be implemented as a substantially circular disc having a thickness sufficient to fix the air flow pattern and to create an "air shroud" that is effective to protect the fuel injector 16. The swirl plate 18 is made of substantially any material capable of withstanding high temperature, a preferred material being stainless steel.

In some embodiments, suitable for combustion of low volatility fuels, combustion tube 210 is further equipped with ceramic foam located downstream from the spray nozzle 16. Substantially any suitable foam may be used, such as SiC ceramic foam.

Heat Exchanger

Referring again to FIG. 1, the exhaust from the burner 60 is routed to a heat exchanger 70. In the example of FIG. 1, heat exchanger 70 consists of two sections. An upstream section consists of a water jacketed tube. A downstream section is a vertical cross flow shell and tube heat exchanger. The vertical cross flow design minimizes steam formation and steam trapping within the cooling tubes. Heat exchanger 70 is provided with an inlet water line 80 and an outlet water line 90, which supply and drain cooling water. The heat exchanger 70 cools the exhaust gas to reach (or assist in reaching) a desired exhaust gas temperature at the inlet to emissions control device 170.

When flow control valve 72 is all or partly closed, a bypass leg 71 diverts a portion of the exhaust around the heat exchanger 70, such that this exhaust is not cooled. The hot-cold proportion of exhaust gas is controlled by varying the setting of flow control valve 72. In this manner, temperature control of the exhaust gas downstream the re-joining of the hot and cold paths is achieved by varying the relative amounts of gas flow through the heat exchanger 70 and through the bypass leg 71.

Because the exhaust is divided into a "cold stream" and a "hot stream", the heat exchanger section of system 100 is also referred to herein as a "dual path exhaust temperature control section". The relative flow in the two paths is controlled, then the two flows are combined, so that the temperature of the mixed flow is determined by the relative proportions of hot and cooled exhaust.

The embodiment of FIG. 1 and other embodiments of the heat exchanger subsystem are described in further detail in connection with FIGS. 2-5.

Oil Injection System

Downstream from the burner 60, the exhaust gas is routed past an oil injection section 110, which may be used to introduce a precisely controlled amount of lubricating oil into the exhaust stream. The oil injection section 110 provides an atomized oil spray comprising oil droplets with a sufficiently small diameter to vaporize and oxidize the oil before it reaches the emissions control device 170. The oil injection system 110 may include means for metering the consumption rate and oxidation state (unburned, partially burned, or fully burned) of the oil delivered downstream the oil injection.

In the example of FIG. 1, motor oil is withdrawn from an oil reservoir 150 by means of an oil pump 160. Substantially any type of pump may be used, preferably a peristaltic pump which feeds the oil from the reservoir through an oil injection line 140 and into a water cooled probe 120 from which the oil is injected into the exhaust gas.

Secondary Air Injection

Secondary air injector 195 is placed upstream of the emissions control device 170, and supplies air into the exhaust flow line 193. Although, this description is in terms of supplying air, injector 195 may be equivalently used to supply any other type of gas or gas mixture into the exhaust flow.

Downstream of secondary air injector 195, the exhaust gas, which may now be mixed with injected oil and/or secondary air, passes through emissions control device 170. Downstream the emissions control device 170, the exhaust gas is vented to the atmosphere.

Control Unit

Referring again to FIG. 1, control unit 180 receives input from various sensors associated with system 100 and delivers control signals to its various actuators. Control unit 180 may be implemented with conventional computing equipment, including processors and memory. It is equipped with suitable input devices, a monitor, and a multi-function data acquisition card, connected to a digital relay module to monitor and record system information, and to control system electronics. Control unit 180 is programmed to run various simulation programs.

The sensors include sensor 50 and may further include sensors for measuring various gas contents and flows. Various measured parameters collected by control unit 180 may include: the mass air flow in the system, the air/fuel ratio, the exhaust gas temperature at the outlet from the heat exchanger, the exhaust gas temperature at the inlet to the emissions control device, and the exhaust gas temperature at the outlet from the emissions control device, and various chemical constitutants of the exhaust. The information measured by the sensors is transmitted by electronic signals to control unit 180, which measures all of the monitored parameters on a periodic basis and stores the measurement data in memory.

The actuators controlled by control unit 180 include the various injectors, pumps, valves, and blowers described above. More specifically, control unit 180 controls the air-to-fuel ratio by modulating the fuel delivered to the fuel injector 16 under either an open loop or closed loop control configuration. Control unit 180 further provides a means to control ignition, air assist to the fuel injector, auxiliary air, fuel feed, blower air feed, and oil injection. An example of a suitable control system would be a proportional integral derivative (PID) control loop.

Control unit 180 monitors system 100 for safety. For example, it may be used to verify that the burner is lighted and that the exhaust is within specified limits for both temperature and air to fuel ratio. The control unit 180 is programmed to identify and address failure modes, and to monitor and control system 100 to a safe shutdown if a failure mode is detected.

Interactive interface programming of control unit 180 permits an operator to develop and run various aging cycles. The operator can use control unit 180 to investigate the effects of exposure to various oils and other fuel contaminants or additives. The inlet temperature to the emissions control device 170 can be adjusted over a wide range of temperatures.

Control unit 180 may be used to switch power to the blowers and fuel pump, as well as control the air assisted fuel injectors, burner spark, oil injection, and auxiliary air. System temperatures, mass air flow for the burner air, and the burner air to fuel ratio are measured and converted to engineering units. The software program uses measured data to calculate total exhaust flow and burner air to fuel ratio, and to check conditions indicative of a system malfunction. The burner air to fuel ratio may be controlled as either open or closed loop, maintaining either specified fuel flow or specified air to fuel ratio. Air to fuel ratio control is achieved by varying the rate of fuel delivered to the burner. Whenever necessary, open loop control can be activated allowing the operator to enter a fixed fuel injector pulse duty cycle. Closed loop control can be activated in which the actual burner air to fuel ratio is measured and compared to the measured value of the air to fuel setpoint and then adjusting the fuel injector duty cycle to correct for the measured error.

Exhaust Gas Temperature Control

As stated above, in FIG. 1, control of the exhaust gas temperature downstream the burner 60 is achieved with a dual-path temperature control section installed on the main exhaust line. On one path, heat exchanger 70 cools the exhaust, with a typical exhaust temperature out of heat exchanger being 400 degrees or less. For purposes of this description, the exhaust path with the heat exchanger 70 is referred to as the "cold leg". A second path is referred to herein as the bypass line 71. Exhaust that flows through bypass line 71 does not pass through the heat exchanger 71. Bypass line 71 is also referred to herein as the "hot leg".

In the embodiment of FIG. 1, the bypass line 71 bypasses exhaust around the heat exchanger 70. A flow control valve 72 is located on the cold leg, at the outlet of the heat exchanger 70, upstream of the point where the exhaust from the hot and cold legs are mixed. The diameter of the bypass line 71 is sufficiently small so as to induce exhaust flow through the heat exchanger 70 when valve 72 is open.

Figure 2:
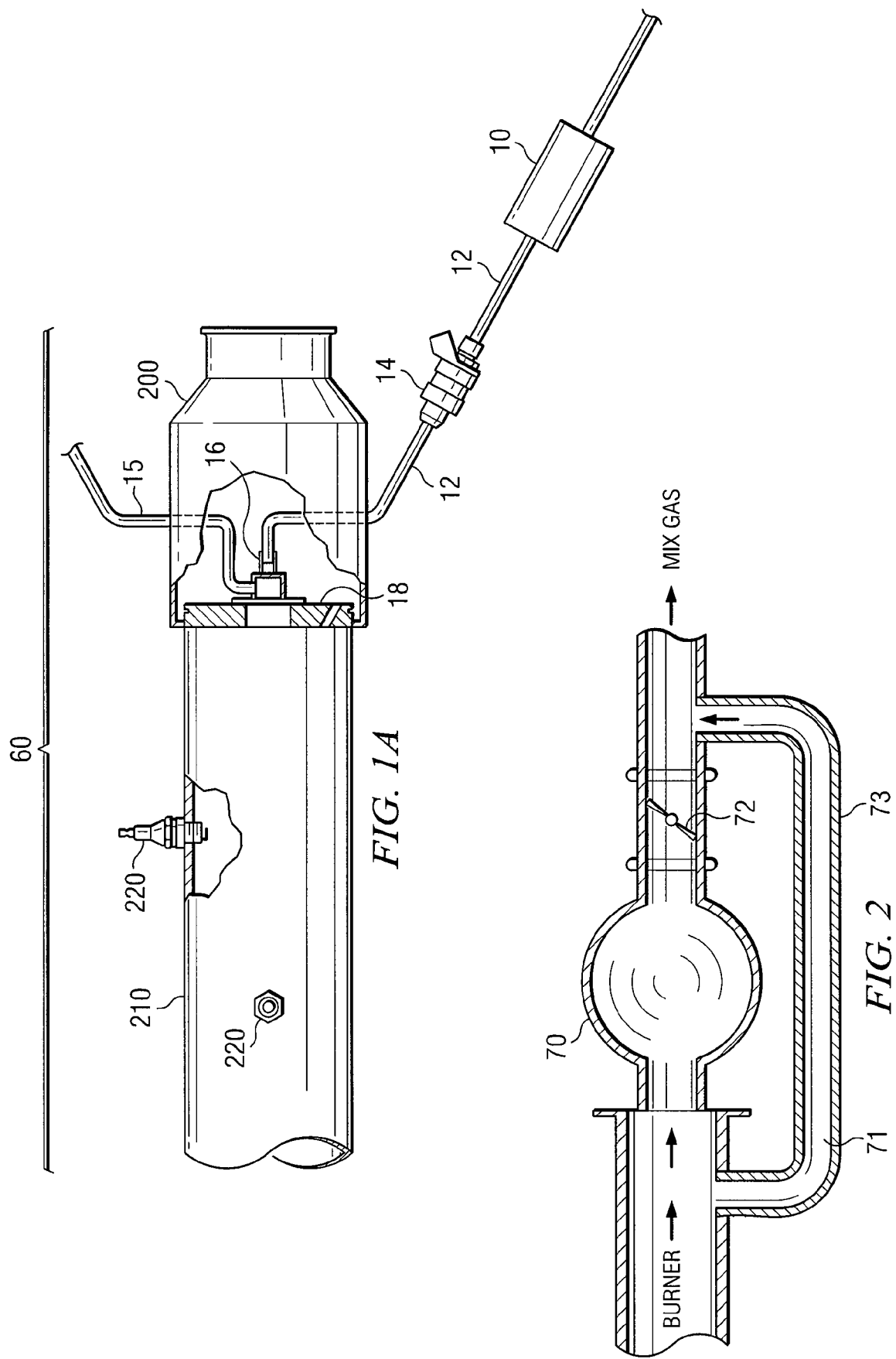
FIG. 2 is a cross sectional view of the dual path temperature control section of FIG. 1.

FIG. 2 illustrates heat exchanger 70, bypass line 71, and control valve 72 in further detail. If needed, the bypass line 71 can be cooled, which can prevent undesired effects such as oxidation of the materials used for line 71 or valve 72. In FIG. 2, this cooling is achieved with a water jacket 73 around the bypass line 71. The fluid in water jacket 73 may be in fluid connection with the cooling water flow of heat exchanger 70.

Figure 3:
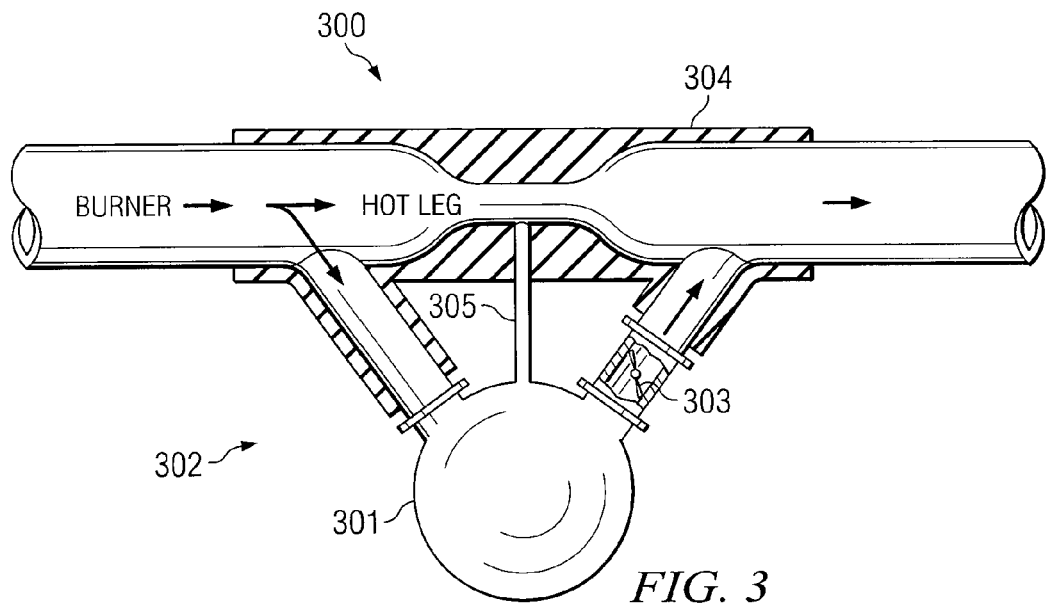
FIG. 3 is a second embodiment of a dual path temperature control section suitable for use with the system of FIG. 1.
Figure 4:
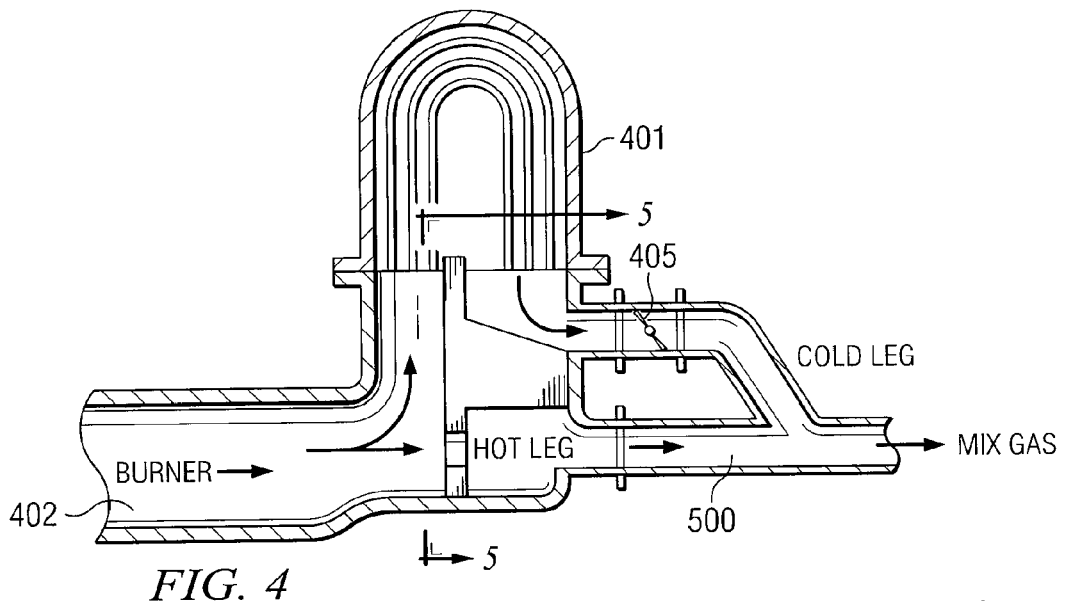
FIG. 4 is a third embodiment of a dual path temperature control section suitable for use with the system of FIG. 1.

FIGS. 3 and 4 illustrate additional embodiments of a dual path temperature control section, suitable for use in a burner-based exhaust gas simulation system. One feature of the various embodiments is the use of a control valve, such as control valve 72, in the cold leg. An example of a suitable control valve, is a "jake brake" type valve.

Also, in all embodiments, the hot leg is designed to provide sufficient backpressure to favor flow through the cold leg. More specifically, the diameter of the hot leg is sufficiently small to induce flow through the cold leg when the flow control valve is fully open. A desired temperature is achieved by blending flow from the hot leg with flow from the cold leg, and by regulating the flow through the cold leg to control the mass flow from the two legs.

FIG. 3 illustrates a configuration of dual path temperature control in which the hot leg is the short straight leg. In this configuration, a narrowed portion of the main exhaust line is used for the hot leg 300. The heat exchanger 301 is on the bypass line, which is the cold leg 302. A flow control valve 303 is located on the cold leg, downstream the heat exchanger 300 but before the cold leg is re-joined with the hot leg. The diameter of the hot leg 300 is sized to induce flow through heat exchanger 300 when flow control valve 303 is fully open.

Compared to the configuration of FIG. 2, the configuration of FIG. 3 results in less heat loss on the hot leg, because the hot leg is straighter and shorter. If desired, hot leg 300 may be cooled, particularly if durability of materials is jeopardized. In the example of FIG. 3, a waterjacket 304 surrounds the hot leg for this purpose. A condensate re-consumption line 305 can be used to deliver condensate to the heat exchanger 301.

FIG. 4 illustrates a third configuration of dual path temperature control. In FIG. 4, the heat exchanger 401 is the cold leg and is located atop the main exhaust flow line. The hot leg is simply a straight path coinciding with (made by narrowing) the main exhaust line 193, and passing under the coils of the heat exchanger 401. An entry chamber 402 in front of heat exchanger 401 receives the exhaust and divides it into two flows.

Figure 5:
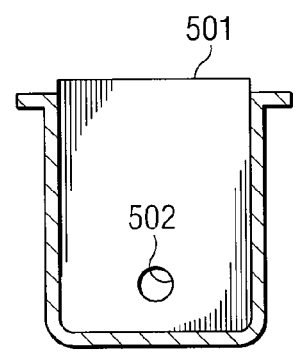
FIG. 5 is a cross sectional view of the entry to the dual path temperature control section of FIG. 4.

FIG. 5 is a cross sectional view of the entry chamber 402, where the exhaust flow from burner 60 is divided into two paths. The flow reaches a flow directional wall 501, which directs some of the exhaust flow both up into the heat exchanger 501 (the cold leg). An aperture 502 in the wall 501 permits some of the exhaust to enter the hot leg 500.

Referring again to FIG. 4, a flow control valve 405 is placed downstream the heat exchanger 401 on the cold leg before it joins the hot leg at a point along the main exhaust line 193. Condensate in the cold leg drains into the hot leg and is re-evaporated by heat.

The embodiments of FIGS. 3-5 are similar in that the hot leg is essentially a narrowed section of the main exhaust line. It is straight and short relative to the cold line, which is diverted from the main exhaust line.

However, the embodiment of FIGS. 4 and 5 may be referred to as a "directional flow heat exchanger" because the hot and cold paths may be contained within a single integrated unit. The chamber 402 and heat exchanger 401 may be housed in a single housing, which has outlets for the cold and hot paths. The cold path is then piped to the valve 405, and both legs re-connected to the main exhaust line 193.

The invention claimed is:

1. A temperature control unit for use with an exhaust gas simulation system, the exhaust gas simulation system having a main exhaust line downstream a combustive burner, comprising:

a chamber for receiving exhaust from the main exhaust line, the chamber having a first port for delivering exhaust to a hot path and a second port for delivering exhaust to a cold path;

wherein the first port and the second port are arranged within the chamber so that the flow of exhaust into the hot path is orthogonal to the flow of exhaust into the cold path;

a heat exchanger for receiving exhaust via the second port, for cooling the exhaust along the cold path, and for delivering cooled exhaust to a cold path outlet line, and a hot path line across the bottom of the chamber and located under the heat exchanger;

wherein the cold path outlet line joins the hot path line at an exhaust juncture downstream the control valve and downstream the heat exchanger.

2. The unit of claim 1, wherein the first port is sized such that the preferred flow path is through the second port.

3. The unit of claim 1, further comprising a control valve on the cold path outlet line.

4. The unit of claim 1, wherein the hot leg is a straight narrowed section of the main exhaust line.

5. The unit of claim 1, wherein the chamber and the heat exchanger are housed in a single housing.

6. The unit of claim 5, wherein the housing has, upstream the exhaust juncture, a cold outlet for delivering exhaust into the cold path line and a hot outlet for delivering exhaust to the hot path.

7. The unit of claim 1, wherein the chamber has a wall facing the exhaust flow into the chamber, the wall configured to divert some exhaust into the first port and the remaining exhaust into the second port.

8. The unit of claim 7, wherein the wall has an aperture sized to narrow the hot leg relative to the cold leg.

* * * * *